(No Model.)
L. R. SAMPLE.
COMBINED HAY RAKER AND LOADER.
No. 259,427. Patented June 13, 1882.
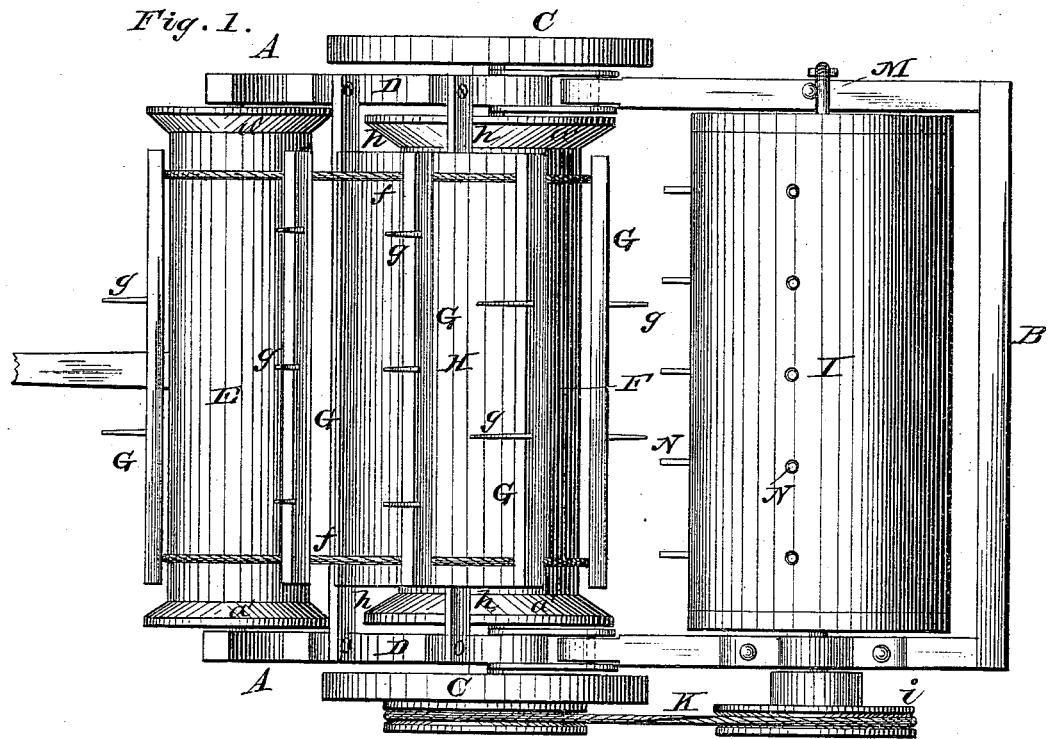
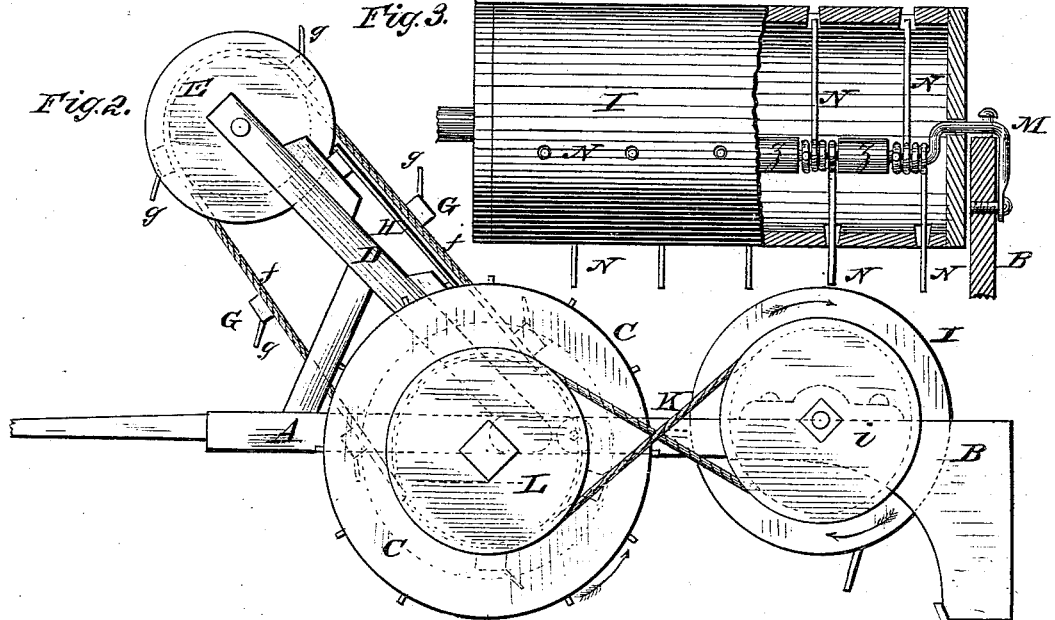
WITNESSES
Fred. G. Dieterich
P. H. Dieterich
INVENTOR
L. R. Sample
by C. A. Snow & Co.
Attorneys

UNITED STATES PATENT OFFICE.

LEVI R. SAMPLE, OF MARSEILLES, ILLINOIS.

COMBINED HAY RAKER AND LOADER.

SPECIFICATION forming part of Letters Patent No. 259,427, dated June 13, 1882.

Application filed December 8, 1881. (No model.)

*To all whom it may concern:*

Be it known that I, LEVI R. SAMPLE, of Marseilles, in the county of La Salle and State of Illinois, have invented certain new and useful Improvements in Combined Hay Rakes and Loaders; and I do hereby declare that the following is a full, clear, and exact description of the invention, which will enable others skilled in the art to which it appertains to make and use the same, reference being had to the accompanying drawings, which form a part of this specification.

This invention relates to that class of hay rakes and loaders which are adapted to be attached to a wagon and drawn over the field, so as to rake up the hay and elevate the same into the wagon.

The object of my improvement is to provide, in connection with the endless carrier which elevates the hay to the wagon, a rotary rake-cylinder arranged to revolve in a direction reversely to the travel of the carrier, whereby the hay will be raked up and delivered onto the latter. A further object is to provide means for retracting the rake-teeth within the rake-cylinder when the hay is delivered from said rake-teeth to the carrier or elevator. These objects I attain by means of the devices illustrated in the accompanying drawings, in which—

Figure 1 is a top or plan view of the machine; Fig. 2, a side elevation; and Fig. 3, a view of the rake-cylinder with a portion broken away, so as to show the inclosed crank-shaft which causes the alternate retraction and projection of the rake-teeth.

The main frame of the machine comprises two parts, A and B, the former and forward part being provided with a suitable tongue or other device for connecting the machine to a hay-wagon. These two parts of the frame are hinged together, so that they will readily conform to inequalities of the ground, the hinges employed being connected with the ends of the side bars of the frame; or, if preferred, the rear part or section of the frame can be hung upon the axle of the supporting and driving wheels C.

The construction of the elevator for carrying up the hay and delivering it onto the hay-wagon is as follows: Upon the front section of the main frame are secured the inclined standards D D, which are firmly supported by means of suitable brace rods or bars, and provided at their upper ends with bearings for the journals of the upper elevator-roller, E. Upon the axle of the main supporting-wheels is secured a roller, F, and around these two rollers pass the endless cords, chains, or bands *f*, to which are connected the transverse slats G. These slats are arranged at proper intervals apart, and are provided with teeth *g*, which engage the hay and carry it up and over the upper roller, so as to discharge the same onto the wagon. These rollers are provided with flanges $a'$ at their ends, which prevent the cords or bands from slipping off, and to prevent the hay from dropping down between the rollers I secure a platform or table, H, to the cross-bars *h*, that are fixed to the inclined standards. The apron or platform H extends somewhat over the lower roller and entirely across the frame.

I indicates the rotary rake-cylinder, which is supported by the rear section of the main frame. One end of this cylinder is journaled in a bearing on said frame, and is further provided with a pulley, *i*, whereby motion is imparted to said cylinder through the medium of a crossed belt or chain, K, which passes around said pulley, and which also passes around a pulley, L, upon one of the main supporting and driving wheels. In lieu, however, of a chain or belt, suitable gear-wheels can be employed.

M indicates a crank-shaft arranged within the rotary rake-cylinder and having its bearings in the ends of the latter. One end of this shaft extends out from the end of the cylinder and is fixed to the frame, so that while the cylinder will be free to revolve the crank-shaft will remain stationary.

The rake-teeth N, which work through perforations in the cylinder, have their inner ends connected with the crank-shaft, so that the teeth can turn freely thereon during the rotation of the cylinder, and they are divided or separated into series by washers *z*, arranged on the shaft. By this arrangement it will be seen that as the teeth revolve about an axis which is eccentric to the axis of the cylinder they will be alternately retracted within and projected out from the cylinder during the operation of the machine. Hence the teeth are thrown out to rake up the hay from the field and to deliver it to the teeth of the elevator-slats, at which latter moment they will be retracted, and thus cease to engage the hay. This prevents the hay from being carried over the cylinder and back to the ground.

In conclusion I will observe that the elevator can be provided with side boards to prevent the hay from being blown off, and wires can also be stretched over the elevator for a like purpose. The rear section of the main frame can be supported by runners or caster-wheels, and the main wheels can be connected with the axle by pawls and ratchets so arranged that when the machine is drawn forward the wheels and axle will turn together, and when the machine is backed the wheels will be free to turn on the axle; also, a bar can be supported over the rake-cylinder and be arranged parallel therewith, said bar having teeth extending down to the cylinder, so as to prevent any hay falling back over the cylinder, which might happen when the hay is very heavy.

What I claim is—

The herein-described improved rake-cylinder, provided with openings at regular intervals, and journaled at one end in a bearing on the supporting-frame, and having a rigid crank-shaft, on which are loosely mounted suitable teeth separated into series corresponding with the openings in the cylinder by washers, substantially as and for the purpose specified.

In testimony that I claim the foregoing as my own I have hereto affixed my signature in presence of two witnesses.

LEVI R. SAMPLE.

Witnesses:
W. A. MOREY,
C. M. BENSON.